United States Patent
Haynes et al.

(10) Patent No.: US 7,555,614 B1
(45) Date of Patent: Jun. 30, 2009

(54) METHODS, SYSTEMS, AND COMPUTER PROGRAM PRODUCTS FOR PREVENTING CONCURRENT EXECUTION OF CONFLICTING SOFTWARE OPERATIONS ON THE SAME AND DIFFERENT STORAGE PROCESSORS HAVING ACCESS TO A COMMON STORAGE MEDIUM WHILE AVOIDING DEADLOCKS

(75) Inventors: Michael D. Haynes, Raleigh, NC (US); Saurabh M. Pathak, Chapel Hill, NC (US); Anita I. Bezera, Raleigh, NC (US); William Paul Hotle, Apex, NC (US); Alan L. Taylor, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 194 days.

(21) Appl. No.: 11/478,833

(22) Filed: Jun. 30, 2006

(51) Int. Cl.
*G06F 12/97* (2006.01)
*G06F 11/00* (2006.01)
*G06F 9/46* (2006.01)

(52) U.S. Cl. .............................. 711/152; 718/107; 714/6
(58) Field of Classification Search ........................ None
See application file for complete search history.

(56) References Cited

U.S. PATENT DOCUMENTS 6,175,853 B1 * 1/2001 Stracke, Jr. .................. 718/107
6,721,902 B1 * 4/2004 Cochran ......................... 714/6

* cited by examiner

*Primary Examiner*—Hyung S Sough
*Assistant Examiner*—Duc T Doan
(74) *Attorney, Agent, or Firm*—Jenkins, Wilson, Taylor & Hunt, P.A.

(57) ABSTRACT

Methods, systems, and computer program products for preventing concurrent execution of conflicting software operations on the same and different storage processors while avoiding the deadlocks are disclosed. According to one method, first and second instances of a first software utility for respectively executing on the first and second storage processors having access to a storage medium are provided. First and second instances of the second software utility for respectively executing on the first and second storage processors are also provided. A lock is provided to instances of the first utility. The lock makes exclusive the operations of checking for an activity query from instances of the second utility and receiving a query from instances of the second utility. A first operation implemented by the first utility may fail if the activity query has been received when the checking occurs.

24 Claims, 4 Drawing Sheets

US 7,555,614 B1

METHODS, SYSTEMS, AND COMPUTER PROGRAM PRODUCTS FOR PREVENTING CONCURRENT EXECUTION OF CONFLICTING SOFTWARE OPERATIONS ON THE SAME AND DIFFERENT STORAGE PROCESSORS HAVING ACCESS TO A COMMON STORAGE MEDIUM WHILE AVOIDING DEADLOCKS

TECHNICAL FIELD

The subject matter described herein relates to preventing conflicting software applications from executing while avoiding deadlocks. More particularly, the subject matter described herein relates to methods, systems, and computer program products for preventing concurrent execution of conflicting software operations on the same and different storage processors having access to a common storage medium while avoiding deadlocks.

BACKGROUND ART

In computer software systems, it may be desirable for applications to execute concurrently. However, it is also desirable to ensure that the applications do not concurrently perform conflicting operations, such as one application writing to a storage location while another application is reading from the storage location.

One particular instance in which it is desirable to ensure that concurrently executing applications do not conflict with each other occurs in software utilities that share access to a storage array. For example, one software utility that accesses a storage array, such as a redundant array of inexpensive disks (RAID) array, is an application, referred to as clones, that makes point in time copies of data stored in a location on a storage array. The clones application may make multiple point in time copies so that a user can go back to a previous version of data if new data is erroneously written over data that it is desirable to keep. The process of making a point in time copy of data on a storage array is referred to herein as cloning. The process of replacing a current copy with a previous point in time copy is referred to herein as reverse synching.

Another software utility that may access a storage array is referred to as the mirror view application. The mirror view application may copy data from a storage medium, such as a RAID array, to a remote storage medium, such as another RAID array, for disaster recovery purposes. The process of copying data to a remote RAID array is referred to as a synch operation.

One example of conflicting operations that may be performed by the clones application and the mirror view application is a synch operation and a reverse synch operation regarding the same data. These two operations conflict with each other because it is not desirable to mirror data from a source logical unit (LUN) when the reverse synch to the source LUN is partially complete due to data mismatches that can occur. A logical unit or LUN is a data structure that represents one or more data storage blocks in a disk array. The data in different blocks of a LUN may be logically related. For example, if the LUN is used to store payroll data, block one of a LUN may include a person's name, and block two may include the person's salary. During a reverse synch, the data in block one may be overwritten with another person's name from a previous point in time copy of the LUN. As a result, the data in block one does not match the data in block 2. It is desirable to prevent this data mismatch from being copied to the mirror LUN by a mirror view application.

One conventional method for avoiding such conflicts is to provide separate locks for the synch and reverse synch operations. For example, when a clones application initiates a reverse synch operation regarding stored data, the clones application may obtain a lock preventing other clones applications from initiating reverse synch operations regarding the data. The clones application may then attempt to obtain a second lock to prevent other mirror view applications from initiating synch operations regarding the data. If a mirror view application attempts to start a synch operation at the same time that the clones application is initiating a reverse synch, the mirror view application will first attempt to obtain the lock for locking other mirror view applications from performing synch operations regarding the data. If the clones application has not yet attempted to obtain this lock, the mirror view application will be successful in obtaining the mirror view lock. However, when the mirror view application attempts to obtain the clones lock, the mirror view application will be unsuccessful in obtaining the clones lock, because this lock has already been obtained by the clones application. Similarly, when the clones application attempts to obtain the mirror view lock, the clones application will be unsuccessful because this lock has already been obtained by the mirror view application. Since both the clones and mirror view applications are waiting for locks from the other applications, and the locks will not be released, a deadlock is created.

Another potential mechanism for avoiding conflicting operations while avoiding deadlocks is to provide a single common software lock for both software utilities. However, such a lock may not be available when one of the utilities operates in kernel space and the other operates in user space, as is the case with the above-referenced clones and mirror view applications.

Accordingly, in light of these difficulties, there exists a need for methods, systems, and computer program products for preventing concurrent execution of conflicting software operations on the same and different storage processors having access to a common storage medium while avoiding deadlocks.

SUMMARY

The subject matter described herein includes methods, systems, and computer program products for preventing concurrent execution of conflicting software operations on the same and different storage processors having access to a common storage medium while avoiding deadlocks. According to one method, first and second instances of a first software utility for respectively executing on first and second storage processors having access to a storage medium are provided. First and second instances of a second software utility for respectively executing on the first and second storage processors are provided. A lock is provided to instances of the first utility. The lock makes exclusive the operations of checking for an activity query from instances of the second utility and receiving a query from instances of the second utility. A first operation implemented by the first utility may fail if the activity query has been received when the checking occurs. The subject matter described herein for preventing conflicting operations by different software utilities from executing while avoiding deadlocks may be implemented using a computer program product comprising computer executable instructions embodied in the computer readable medium. Exemplary computer readable media suitable for implementing the subject matter described herein include chip memory devices, disk memory devices, programmable logic devices, and application specific integrated circuits. In addition, a computer program product that implements the subject matter described herein may be located on a single device or computer platform or may be distributed across multiple devices for computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
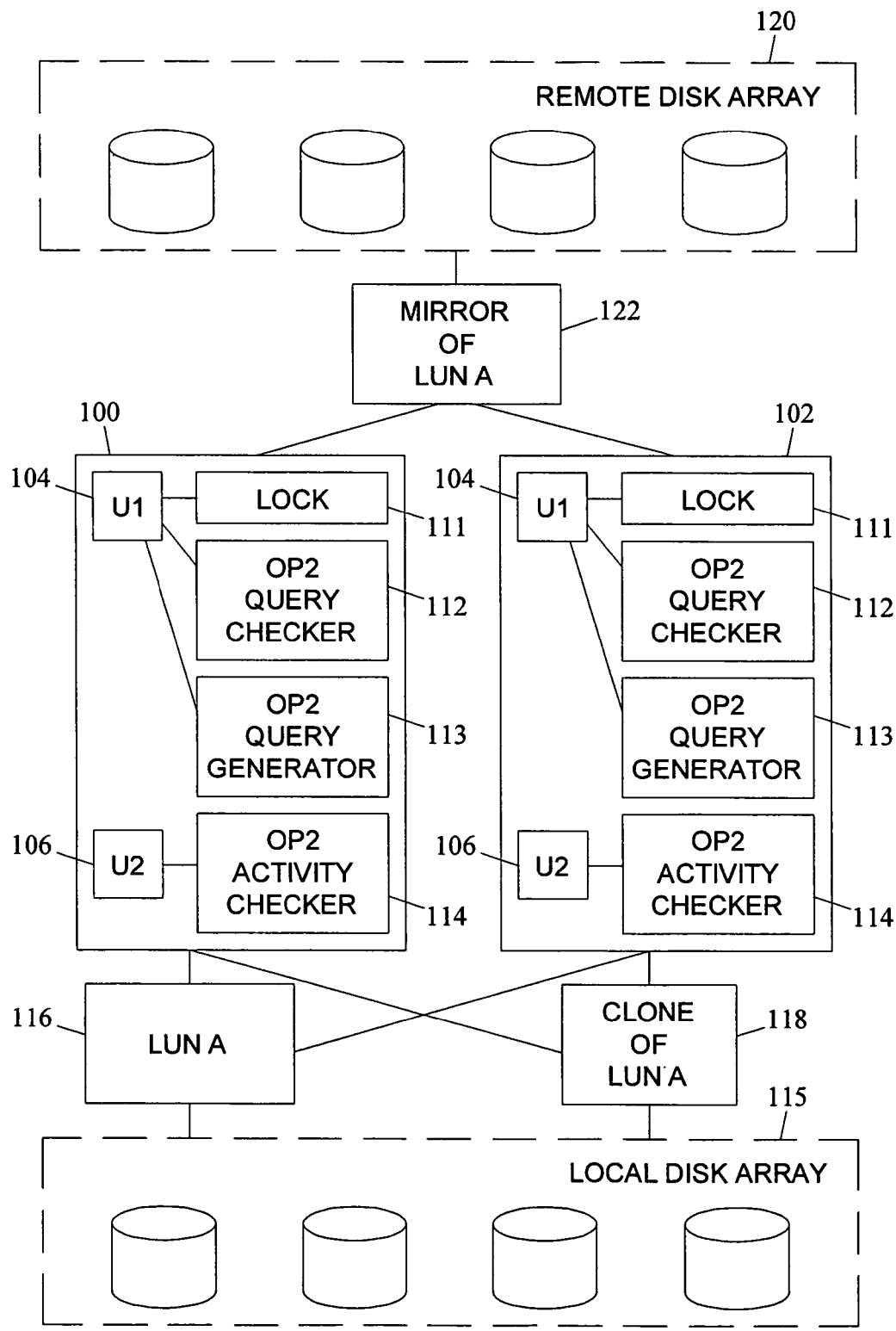
FIG. 1 is a block diagram of the system for preventing conflicting operations by different software utilities from concurrently executing while avoiding deadlocks according to an embodiment of the subject matter described herein.

FIG. 1 is a block diagram of a system for preventing concurrent conflicting operations by different software utilities on the same and different storage processors having access to a shared storage medium while avoiding deadlocks according to an embodiment of the subject matter described herein. Referring to FIG. 1, the system includes first and second storage processors 100 and 102 each having instances of software utilities U1 and U2. More particularly, storage processor 100 includes a first instance 104 of software utility U1 and a first instance 106 of a software utility U2. Similarly, storage processor 102 includes a second instance 108 of software utility U1 and a second instance 110 of software utility U2.

Software utilities U1 and U2 may respectively operate in kernel and user space, making a common software lock unavailable for preventing conflicting operations. According the subject matter described herein, utility U1 includes computer code that implements a lock, illustrated by lock 111 in FIG. 1 that makes exclusive the operations of checking for an activity query from utility U2 and receiving a query from utility U2. In FIG. 1, the computer code in utility U1 that check for an activity query from utility U2 is indicated by OP2 query checker 112. Utility U1 also includes the code that generates the query from utility U2. For example, OP2 query generator 113 may be computer code present in utility U1 that is callable by utility U2 to set a flag indicating that operation 2 is querying operation 1 to determine whether operation 1 has started. It is this query that is referred to herein as the operation 2 activity query. Operation 1 will fail if it tries to start after the query has been received. FIG. 1 also illustrates computer code in utility U2 referred to as operation 2 activity checker 114. Operation 2 activity checker 114 may be code in utility U2 that is callable by utility U1 to determine whether operation 2 associated with utility U2 has started. If operation 2 is active when operation 2 activity checker 114 is called, operation 1 will fail. Thus, operation 2 always wins if it is in the process of starting or is active when operation 1 starts. Operation 1 will be successful if it starts and performs operation 2 query checking before operation 2 is active or initiates the query.

In one illustrated example, utility U1 is assumed to be the above-referenced clones application and utility U2 is assumed to be the above referenced mirror view application. As such, utility U1 may make point in time copies of data stored on local disk array 115. In one implementation, utility U1 may copy a data structure that represents data stored on disk array 115, referred as a logical unit (LUN) 116, from one location on local disk array 115 to another location on the same disk array. The copy of the data in the second location is referred to as a clone, which is illustrated by reference numeral 118. Utility U1 may also perform the above-described reverse synch operation where a current copy of a LUN is replaced with a previously made point in time copy.

In the illustrated example, it is also assumed that utility U2 is the above-referenced mirror view application. Accordingly, utility U2 may make a backup copy of LUN 116 to a remote disk array 120. This copy is referred to as a mirror and is illustrated by reference numeral 122 in FIG. 1. The process of making the copy is referred to as a synch operation. As stated above, it is desirable that synch and reverse synch operations involving the same data do not occur concurrently and that if a mirror view synch has started, a clones reverse synch must refuse to start (fail). Conversely, if a clone reverse synch has started, a mirror view synch must refuse to start (fail). The subject matter described herein provides a mechanism through flags and a clones lock to enforce these conditions while avoiding deadlocks.

Although the examples described herein are explained with reference to the synch and reverse synch operations, the subject matter described herein is not limited to preventing concurrent execution of these operations while avoiding deadlocks. The subject matter described herein may be used for preventing concurrent execution of any operations that execute on the same and different storage processors.

The subject matter described herein may be implemented on any suitable platform where two or more processors share access to a storage medium. One example of a commercially available platform on which the subject matter described herein may be implemented is the Clariion® platform available from EMC Corporation of Hopkinton, Mass.

Figure 2:
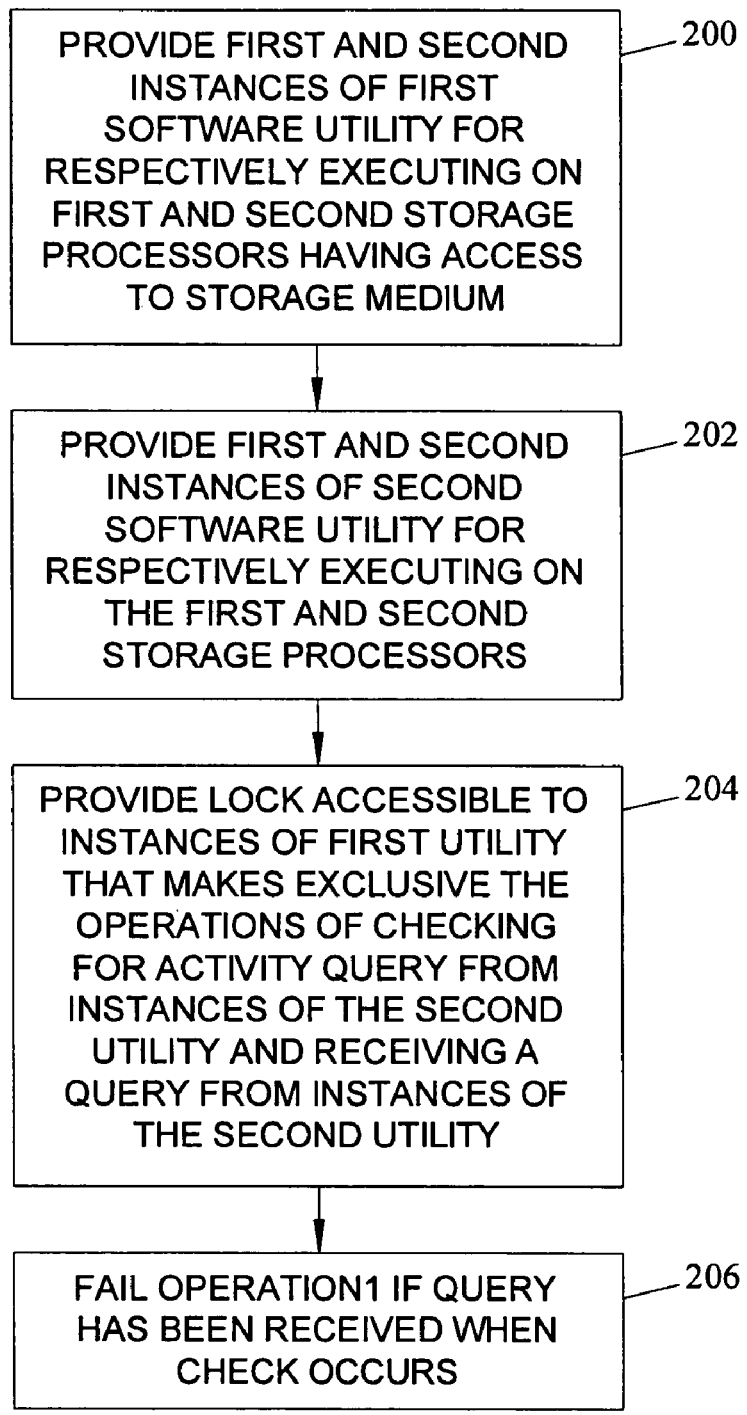
FIG. 2 is a flow chart illustrating exemplary overall steps of a process for preventing conflicting operations by different software utilities from concurrently executing while avoiding deadlocks according to an embodiment of the subject matter described herein.

FIG. 2 is a flow chart illustrating exemplary overall steps for preventing concurrent conflicting operations on the same and different storage processors while avoiding deadlocks according to an embodiment of the subject matter described herein. Referring to FIG. 2, in step 200, first and second instances of a first software utility for respectively executing on first and second storage processors having access to a storage medium are provided. In step 202, first and second instances of the second software utility for respectively executing on the first and second storage processors are provided. In step 204, a common lock accessible to the first and second instances of the first and second software utility is provided. The common lock prevents the instances of the first and second software utilities from concurrently executing conflicting operations while avoiding deadlocks.

Table 1 shown below illustrates computer code for two operations, operation 1 and operation 2, that are assumed to be conflicting. Embedded within Table 1 is a lock accessible by operation 1 that makes exclusive the operation 1 sub-operations of checking for an activity query from operation 2 and receiving a query from operation 2. This lock in combination with the query_received, proceed1, and proceed2 flags ensure that operation 1 and operation 2 do not execute concurrently, that operation 1 fails to start if operation 2 is starting, and avoid deadlocks.

TABLE 1

Source Code for Operations 1 and 2 with Single Lock and Deadlock Avoidance

| Operation 1 | Operation 2 |
| --- | --- |
| query_received = False | StartingOp2 = True |
| proceed1 = !IsOp2Active( ) | Proceed2 = !IsOp1Active( ) |
| Get Lock1 | if (proceed2) |
| if (query_received) |   Op2Active = true |
|   proceed1 = False |   StartingOp2 = false |
| if (proceed1) |   Complete Operation 2 |
|   Op1Active = True |   Op2Active = False |
| Release Lock1 | Else |
| If (proceed1) |   Fail Operation 2 |
|   Complete Operation 1 |   StartingOp2 = False |
|   Op1Active = False | |
| Else | |
|   Fail Operation 1 | |
| IsOp1Active( ) | IsOp2Active( ) |
| Get Lock1 | If (StartingOp2) |
| query_received = True |   Return True |
| If (Op1Active) | Else if (Op2Active) |
|   return_value = True |   Return True |
| else | Else |
|   return_value = False |   Return False |
| Release Lock1 | |
| Return (return_value) | |

In Table 1, the code in the left-hand column may be part of the same software utility, such as utility U1 illustrated in FIG. 1. The code in the right-hand column may be part of another software utility, such as utility U2 illustrated in FIG. 1. In the illustrated code for operation 1 of utility U1, a lock is provided such that operation 1 of utility U1 obtains a lock when it is checking whether a query has been received from operation 2 of utility U2. Operation 2 of utility U2 does not get the lock. Rather, operation 2 calls IsOp1Active( ), which sets query_received to true and determines whether operation 1 is active. If operation 1 is already active, operation 2 will fail. If operation 1 is not active, operation 2 will execute.

It should also be that if operation 1 tries to start after a query has been received from operation 2, operation 1 will fail, even if operation 2 has not yet started. The mere fact that a query has been received from operation 2 will cause operation 1 to fail, which avoids a deadlock condition. Thus, by using the query_received flag to control which operation can execute and by using a lock accessible by one operation, one application can cause the other not to start and will prevent the above-described deadlock and concurrent operation problems.

In Table 1, in the first line of operation 1, operation 1 sets a variable called query_received to false. This variable stores a Boolean value to indicate whether operation 1 has received a query from operation 2. In the second line of operation 1, operation 1 calls a routine IsOp2Active( ). The function IsOp2Active( ) determines whether operation 2 is currently active or has started. If operation 2 is active or has started, operation 1 sets a variable proceed1 to false, which causes operation 1 to fail.

After operation 1 determines whether operation 2 is active, operation 1 attempts to get a lock. If IsOp1Active( ) is currently holding the lock, operation 1 will wait until IsOp1Active( ) releases the lock. The waiting is not shown expressly in Table 1 but is implied by the statement Get Lock1, which will not be executed successfully until Lock1 is available. If operation 1 is successful in obtaining the lock, operation 1 executes code for determining whether operation 2 is trying to start. The code is evidence by the statement if (query_received), which checks whether operation 1 has received a query from operation 2. Query_received is set to true during the IsOp1Active( ) routine of operation 2 while it operation 2 holds the lock. If operation 1 determines that query_received is true, then operation 1 sets proceed1 to false, then operation 1 fails. If operation 1 determines that query_received is set to true, operation 1 sets Op1Active to true, preventing operation 2 from proceeding. Operation 1 releases the lock after checking if the query has been received and checking if proceed1 is set to true. Once operation 1 releases the lock, if operation 1 can proceed, operation 1 completes and sets the indicator Op1Active that indicates it is operating to false. If operation 1 cannot proceed, for example, because proceed1 is false, operation 1 fails.

In line 1 of operation 2, operation 2 begins by setting a variable StartingOp2 to true, indicating that operation 2 is starting. Operation 2 then determines whether operation 1 is active by executing the function IsOp1Active( ). IsOp1Active( ) attempts to get lock1. If successful in getting lock1, IsOp1Active( ) sets the query_received variable to true, which is checked by operation 1 to determine whether operation 2 is starting. IsOp1Active( ) then determines whether or not operation 1 is active and releases the lock.

The code IsOp1Active( ) will either be executed before or after the code surrounded by the get lock1 and release lock1 statements in operation 1. As a result, the query from operation 2 will either occur before operation 1 checks for the query or after operation 1 checks for the query. If query occurs before operation 1 checks for the query, operation 2 will execute and operation 1 will fail, provided that operation 1 is not currently active. Similarly, if the query occurs after operation 1 checks for the query, operation 1 will execute and operation 2 will fail.

The above listed code may be used for any operations for which it is desirable to prevent concurrent execution, whether these operations are executing on the same or different storage processors. Table 2 shown below illustrates an example where operation 1 and operation 2 have been replaced by the clones reverse synch and mirror view synch operations described above.

TABLE 2

Conflicting Operations and Dead Lock of Avoidance Code for Clones Reverse Synch and Mirror View Synch Operations

| Clone Reverse-synch | MirrorView Synch |
| --- | --- |
| query_received = False | StartingMVSynch = True |
| proceed1 = !IsMVSynchActive( ) | proceed2 = !IsReverseSynchActive( ) |
| Get Lock1 | if (proceed2) |
| if (query_received) |   MVSynchActive = true |
|   proceed1 = False |   StartingMVSynch = false |
| if (proceed1) |   Complete MV Synch |
|   ReverseSynchActive = True |   MVSynchActive = False |
| Release Lock1 | Else |
| If (proceed1) |   Fail MirrorView Synch |
|   Complete Reverse-synch |   StartingMVSynch = False |
|   ReverseSynchActive = False | |
| Else | |
|   Fail Clone Reverse Synch | |

TABLE 2-continued

Conflicting Operations and Dead Lock of Avoidance Code for
Clones Reverse Synch and Mirror View Synch Operations

| IsReverseSynchActive( ) | IsMVSynchActive( ) |
| --- | --- |
| Get Lock1 | If (StartingMVSynch) |
| query_received = True | Return True |
| If (ReverseSynchActive) | Else if (MVSynchActive) |
| return_value = True | Return True |
| else | Else |
| return_value = False | Return False |
| Release Lock1 | |
| Return (return_value) | |

Table 2 includes the same locking mechanism described above with regard to Table 1. The difference between Tables 1 and 2 is that Table 2 provides specific examples of operations for which it may be desirable to avoid concurrency. The remaining portions of Table 2 are the same as the corresponding portions of Table 1. Hence, a description thereof will not be repeated herein.

Figure 3:
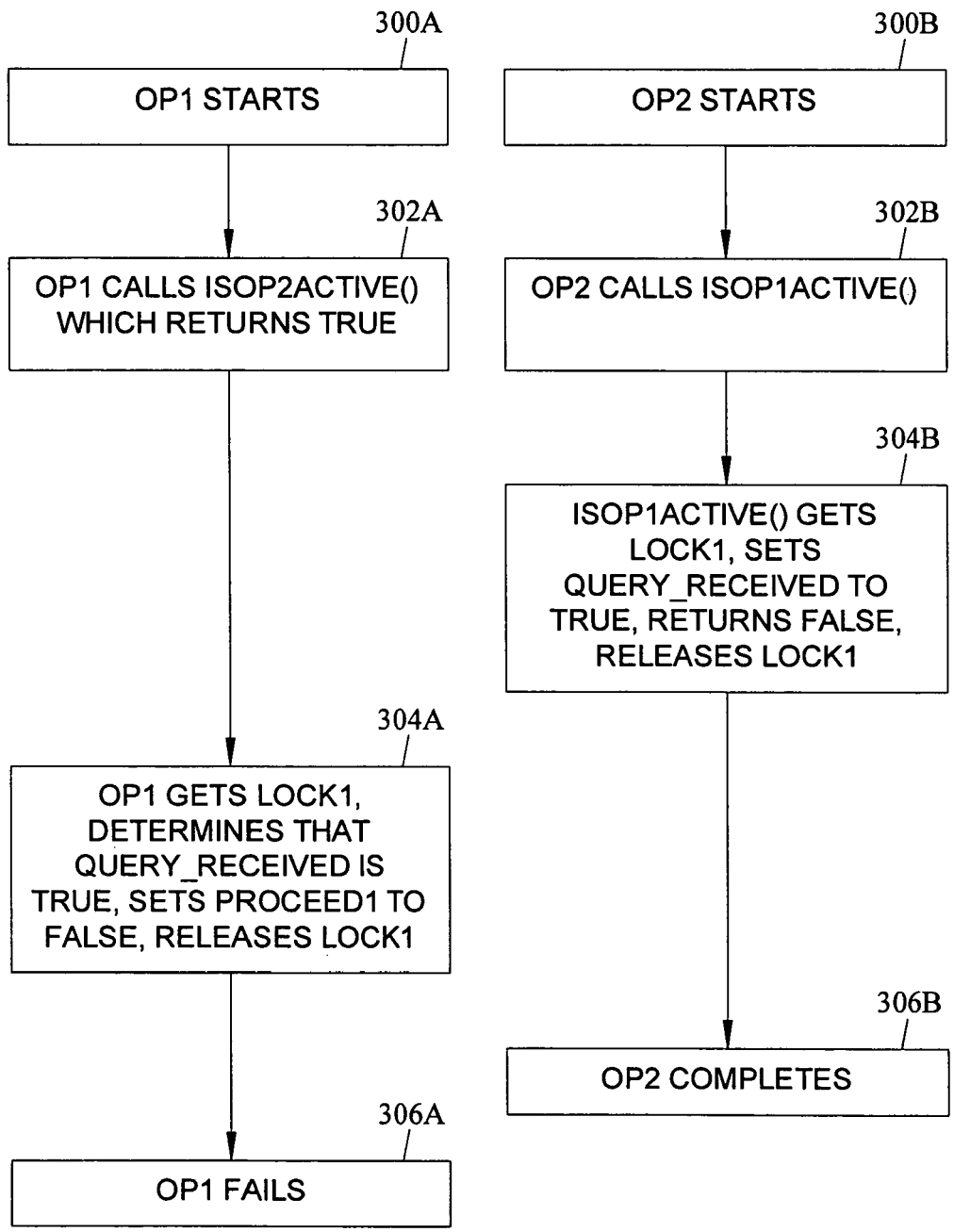
FIG. 3 is a flow chart illustrating exemplary steps that occur when a first operation being performed by a first software utility checks for an activity query from a second operation being performed by software utility after the query has been received according to an embodiment of the subject matter described herein.

FIG. 3 is a flow chart illustrating exemplary steps that occur when operation 1 receives the query and then checks for the query. Referring to FIG. 3, in step 300A, operation 1 starts. In step 300B, which may be performed at or near the same time as step 300A, operation 2 starts. In step 302A, operation 1 calls IsOp2Active( ), which returns true. In step 302B, operation 2 calls IsOp1Active( ). In step 304B, IsOp1Active( ) gets lock 1, sets query_received to true, returns false, and releases lock1. In step 304A, which is assumed to occur after step 304B, operation 1 gets lock 1, determines that query received is true, sets proceed1 to false, and releases lock1. In step 306A, operation 1 fails. In step 306B, operation 2 completes.

Figure 4:
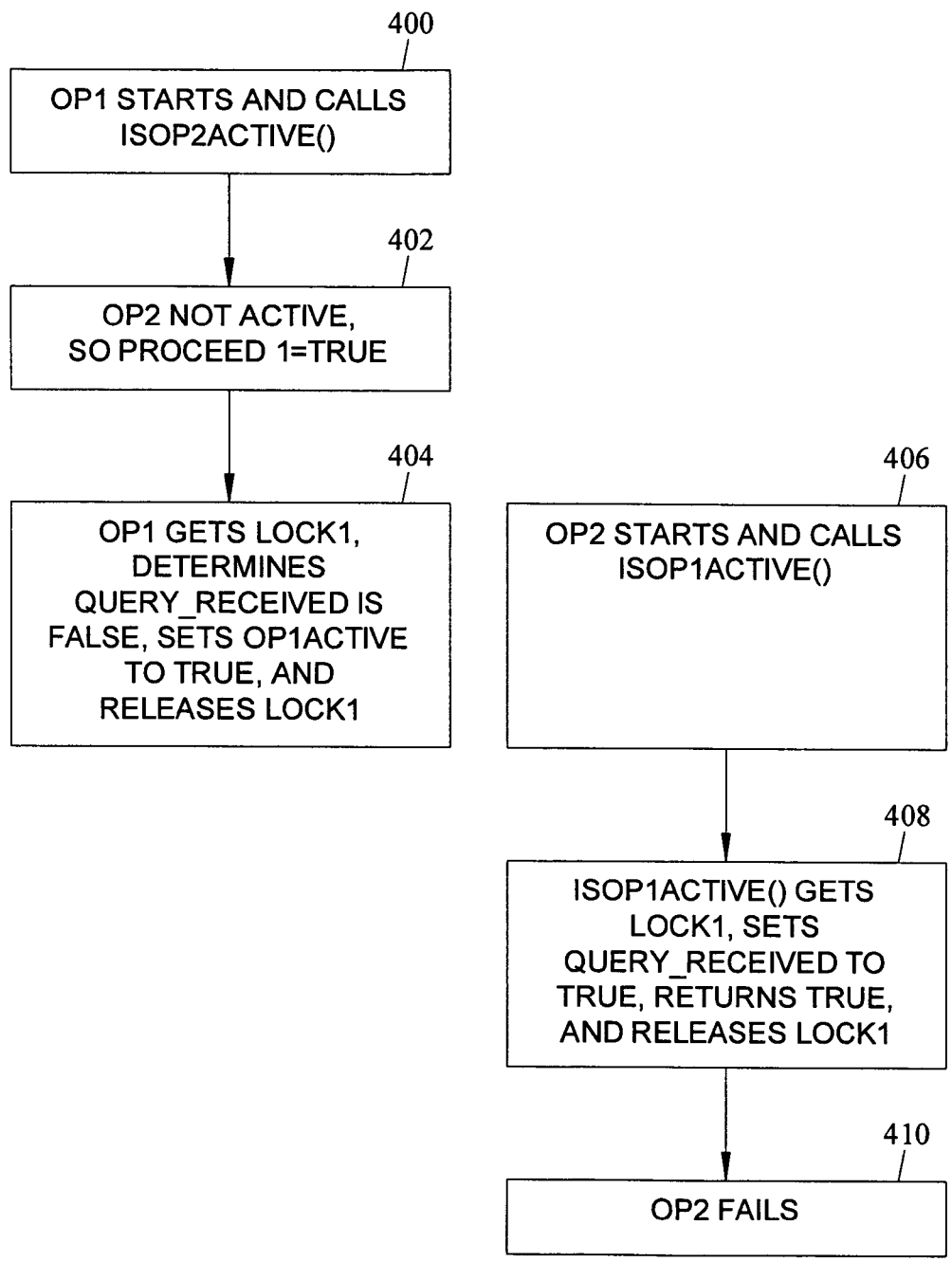
FIG. 4 is a flow chart illustrating exemplary steps that occur when the first operation being performed by a first software utility checks for an activity query from a second operation being performed by software utility before the query has been received according to an embodiment of the subject matter described herein.

FIG. 4 is a flow chart illustrating exemplary steps that occur when operation 1 checks for a query and starts before operation 2 is active or sends the query. Referring to FIG. 4, in step 400, operation 1 starts and calls IsOp2Active( ). In step 402, operation 2 is not active, so operation 1 sets proceed1 to true. In step 404, operation 1 gets lock 1, determines that query received is false, sets Op1Active to true, and releases lock1. In step 406, operation 2 starts and calls IsOp1Active( ). In step 408, IsOp1Active( ) gets lock1, sets query_received to true, returns true, and releases lock1. In step 410, operation 2 fails.

It will be understood that various details of the invention may be changed without departing from the scope of the invention. Furthermore, the foregoing description is for the purpose of illustration only, and not for the purpose of limitation.

What is claimed is:

1. A method for preventing concurrent execution of conflicting software operations on the same and different storage processors while avoiding deadlocks, the method comprising:
    (a) providing a first and a second instance of a first software utility for respectively executing on a first and a second storage processor having access to a storage medium;
    (b) providing a first and a second instance of a second software utility for respectively executing on the first and the second storage processor and providing a lock to the instances of the first software utility;
    (c) wherein when one of the first instances of the first software utility obtains the lock, the obtaining of the lock makes exclusive:
        the operation of checking whether an activity query, which indicates that one of the instances of the second software utility is starting, has been received from one of the instances of the second software utility; and
        the operation of receiving the activity query from one of the instances of the second software utility, such that holding the lock by an instance of the first software utility to check for reception of the activity query prevents an instance of the second software utility from communicating the activity query to the instance of the first software utility while the instance of the first software utility is checking whether the activity query has been received; and
    (d) failing a first operation implemented by the first software utility in response to receiving the activity query initiated by a second operation implemented by one of the instances of the second software utility before the checking occurs.

2. The method of claim 1 wherein the first software utility comprises a clones software utility for making point in time copies of data stored on the storage medium.

3. The method of claim 2 wherein the second software utility comprises a mirror view software utility for copying data from the storage medium to a remote storage medium.

4. The method of claim 3 wherein the first operation comprises a reverse synch operation performed by the clones software utility for replacing a current copy of data stored on the storage medium with a previously stored point in time copy and wherein the second operation comprises a mirror view synch operation for copying the data involved in the reverse synch operation to a remote location.

5. The method of claim 1 comprising, in response to one of the instances of the first software utility obtaining the lock, setting an indication to indicate that the first operation is active and releasing the lock after setting the indication to indicate that the first operation is active.

6. The method of claim 5 comprising, in response to detecting that the first operation is active, failing the second operation.

7. The method of claim 1 wherein the first operation is adapted to execute in response to detecting that the second operation is not active and in response to checking for the activity query prior to the activity query being generated by one of the instances of the second software utility.

8. The method of claim 1 wherein the first software utility includes computer code callable by the second software utility for initiating the activity query.

9. A system for preventing concurrent execution of conflicting software operations on the same and different storage processors while avoiding deadlocks, the system comprising:
    (a) a storage medium;
    (b) first and second storage processors for sharing access to the storage medium;
    (c) first and second instances of a first software utility for respectively executing on the first and second storage processors;
    (d) first and second instances of a second software utility for respectively executing on the first and second storage; and
    (e) a lock usable by instances of the first software utility for making exclusive:
        the operation of checking whether an activity query, which indicates that one of the instances of the second software utility is starting, has been received from one of the instances of the second software utility; and
        the operation of detecting the activity query from instances of the second software utility, such that holding the lock by an instance of the first software utility to check for reception of the activity query prevents an instance of the second software utility from communicating the activity query to the instance of the first software utility while the instance of the first software utility is checking whether the activity query has been received and wherein a first operation implemented by one of the first and second instances of the first software utility is adapted to fail in response to checking for the activity query after the activity query has been generated by one of the first and second instances of the second software utility.

10. The system of claim 9 wherein the first software utility comprises a clones utility for making point in time copies of data stored on the storage medium.

11. The system of claim 10 wherein the second software utility comprises a mirror view utility for copying data stored on the storage medium to a remote storage medium.

12. The system of claim 11 wherein the first operation comprises a reverse synch operation from being performed by the clones utility for replacing a current copy of data stored on the storage medium with a previously stored point in time copy and wherein the second operation comprises a mirror view synch operation for copying the data involved in the reverse synch operation to a remote location.

13. The system of claim 12 wherein the reverse synch operation is adapted to, in response to obtaining the lock, determine whether the mirror view synch operation is active, and in response to determining that the mirror view synch operation is not active, to set an indicator indicating that the reverse synch operation is active.

14. The system of claim 13 wherein the mirror view synch operation is adapted to fail in response to detecting the indicator indicating that the reverse synch operation is active.

15. The system of claim 12 wherein the mirror view synch operation is adapted to initiate the activity query by calling computer code associated with the clones utility for determining whether the reverse synch operation is active.

16. The system of claim 13 wherein the first operation is adapted to execute in response to the second operation being inactive and in response to checking for the activity query prior to the activity query being initiated.

17. A computer program product comprising computer-executable instructions embodied in a computer-readable storage medium for performing steps comprising:
  (a) providing a first and a second instance of a first software utility for respectively executing on a first and a second storage processor having access to a storage medium;
  (b) providing a first and a second instance of a second software utility for respectively executing on the first and the second storage processor and providing a lock to the instances of the first software utility; and
  (c) wherein when one of the first instances of the first software utility obtains the lock, the obtaining of the lock makes exclusive:
    the operation of checking whether an activity query, which indicates that one of the instances of the second software utility is starting, has been received from one of the instances of the second software utility, and
    the operation of receiving the activity query from one of the instances of the second software utility, such that holding the lock by an instance of the first software utility to check for reception of the activity query prevents an instance of the second software utility from communicating the activity query to the instance of the first software utility while the instance of the first software utility is checking whether the activity query has been received; and
  (d) failing a first operation implemented by the first software utility in response to receiving the activity query initiated by a second operation implemented by one of the instances of the second software utility before the checking occurs.

18. The computer program product of claim 17 wherein the first software utility comprises a clones software utility for making point in time copies of data stored on the storage medium.

19. The computer program product of claim 18 wherein the second software utility comprises a mirror view software application for copying data from the storage medium to a remote storage medium.

20. The computer program product of claim 19 wherein the first operation comprises a reverse synch operation performed by the clones utility for replacing a current copy of data stored on the storage medium with a previously stored point in time copy and wherein the second operation comprises a mirror view synch operation for copying the data involved in the reverse synch operation to a remote location.

21. The computer program product of claim 17 comprising, in response to the first instance of the first software utility obtaining the lock, setting an indication to indicate that the first operation is active and releasing the lock after setting the indication to indicate that the first operation is active.

22. The computer program product of claim 21 comprising, in response to detecting that the first operation is active, failing the second operation.

23. The computer program product of claim 17 wherein the first operation is adapted to execute in response to detecting that the second operation is not active and in response to checking for the activity query prior to the activity query being generated by one of the instances of the second software utility.

24. The computer program product of claim 17 wherein the first software utility includes computer code callable by the second software utility for initiating the activity query.

* * * * *